United States Patent
Knepper et al.

(10) Patent No.: US 6,664,907 B1
(45) Date of Patent: Dec. 16, 2003

(54) INFORMATION HANDLING SYSTEM WITH SELF-CALIBRATING DIGITAL-TO-ANALOG CONVERTER

(75) Inventors: Lawrence E. Knepper, Austin, TX (US); Zheng Yuan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/172,641

(22) Filed: Jun. 14, 2002

(51) Int. Cl.[7] .................................................. H03M 1/10
(52) U.S. Cl. ........................ 341/120; 341/131; 341/144; 341/155; 345/98; 345/99
(58) Field of Search ................................. 341/120, 144, 341/156, 155, 122, 160; 345/99, 98, 204

(56) References Cited

U.S. PATENT DOCUMENTS

| | | | |
|---|---|---|---|
| 5,001,480 A | * 3/1991 | Ferry et al. | 341/144 |
| 5,604,510 A | * 2/1997 | Blanchard | 345/98 |
| 6,008,801 A | * 12/1999 | Jeong | 345/204 |
| 6,049,321 A | * 4/2000 | Sasaki | 345/99 |
| 6,452,526 B2 | * 9/2002 | Sagawa et al. | 341/144 |

* cited by examiner

Primary Examiner—Michael Tokar
Assistant Examiner—Lam Mai
(74) Attorney, Agent, or Firm—Baker Botts L.L.P.

(57) ABSTRACT

A self-calibrating video circuit comprises a first and second digital-to-analog converter generating first and second output signals, and a calibration circuit coupled with the first and second digital-to-analog converters for calibrating the first digital-to-analog converter output signal to the output signal of the second digital-to-analog converter.

28 Claims, 3 Drawing Sheets

INFORMATION HANDLING SYSTEM WITH SELF-CALIBRATING DIGITAL-TO-ANALOG CONVERTER

FIELD OF THE INVENTION

The present invention relates to a digital-to-analog converter arrangement. In particular, the present invention relates to digital-to-analog converters in information handling systems, for example, in a graphics controller unit for providing an RGB signal.

BACKGROUND OF THE INVENTION

As the value and use of information continues to increase, individuals and businesses seek additional ways to process and store information. One option available to users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, such as a modular computer system, include usually a graphics card which can be inserted in a slot of an expansion system of the computer. Other systems, such as all-in-one systems, may include a graphics controller unit integrated within the system architecture. In any case, graphics controllers use a plurality of digital-to-analog converters for generating a video signal, such as an RGB signal necessary to produce an image on the screen of a monitor. For an RGB signal usually three digital-to-analog converters are necessary to provide separate signals for RED, GREEN, and BLUE. In critical applications, such as image processing, color accuracy is very important. For example, the white-level is one of the important critical parameters. To generate the "color" white on a monitor, all three primary color signals RED, GREEN, and BLUE are set to their maximum value. In particular, certain standards, such as the VESA VSIS specification, require that the white-level difference between the RED, GREEN, and BLUE Digital-to-Analog converter (DAC) outputs be nominally no greater than 42 mV. Therefore, DAC outputs can differ from each other as much as 42 mV (for a nominal white level) and still meet the specification requirement.

However, for color critical applications, the human eye can visually detect a much smaller difference in a DAC output. In fact, each least significant bit (LSB) of a DAC voltage output is only approximately 2.7 mV for an 8-bit DAC. Outputs that are different by the permissible 42 mV would then be different by approximately 15 LSB, which would include 4 bits out of the 8-bit color band field. The human eye, however, can detect a difference as small as 2 or 3 LSBs. Therefore, differences between the output accuracy of the DACs can highly affect the accuracy of the colors presented on a monitor. Other factors aggravate the above described problems; the on chip tracking between the three DACs can be different; the 75 Ohm termination resistors in the graphics card and on the display side of the cable can have a tolerance limitations and other components, such as necessary filters, can further affect the DAC output voltage.

SUMMARY OF THE INVENTION

Therefore, a need for an improved DAC arrangement with the capability of avoiding inaccuracy of multiple DACs exists.

A first embodiment of the present invention is a self-calibrating video circuit comprising a first and second digital-to-analog converter generating first and second output signals, and a calibration circuit coupled with the first and second digital-to-analog converters for calibrating the first digital-to-analog converter output signal to the output signal of the second digital-to-analog converter.

A second embodiment is an information handling system with a self-calibrating video circuit.

The calibration circuit can comprise a comparator for comparing the level of the first and second output signal and generating a calibration signal fed to the first digital-to-analog converter. Furthermore, the circuit can comprise an analog-to-digital converter receiving the calibration signal and a calibration unit coupled with the output of the analog-to-digital converter and the first digital-to-analog converter. The calibration unit may also comprise a register for storing the output signal of the analog-to-digital converter. Yet another digital-to-analog converter coupled with the register and an offset generator coupled with the another digital-to-analog converter for generating an offset signal fed to the first digital-to-analog converter may be provided. The offset generator can comprise an operational amplifier. The comparator can comprise a first and second comparator for generating a positive or negative difference signal. Furthermore, associated first and second analog-to-digital converters coupled with associated first and second registers for storing a positive or negative calibration value can be provided. Also, the circuit may comprise associated third and fourth digital-to-analog converters each having an input coupled with the first and second registers, respectively and an operational amplifier for generating a calibration signal fed to the first digital-to-analog converter wherein the third and fourth digital-to-analog converters each comprise an output coupled with a first and second input of the operational amplifier, respectively. The operational amplifier can have an offset input. The circuit can further comprise an additional digital-to-analog converter generating an additional output signal and a second calibration circuit coupled with the additional and the second digital-to-analog converters for calibrating the additional digital-to-analog converter output signal to the output signal of the second digital-to-analog converter.

A method of operating an information handling system having a self-calibrating video circuit with a first and second digital-to-analog converter generating a first and second output signal, according to the present invention comprises the steps of:

applying a digital white signal to the first and second digital-to-analog converter;

determining the difference between a first and a second output signal; and calibrating the first digital-to-analog converter to match the output signal of the second digital-to-analog converter.

The step applying a digital white signal may include the transfer of logical "1" input signals to the digital-to-analog converters. A step of storing the difference in a register may be provided. The steps can be performed after a reset of the information handling system. The step of storing the difference can be performed after a predetermined settling time. Furthermore, the steps according to the method can be performed after a manual trigger signal.

Other technical advantages of the present disclosure will be readily apparent to one skilled in the art from the following figures, descriptions, and claims. Various embodiments of the present application obtain only a subset of the advantages set forth. No one advantage is critical to the embodiments.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION OF THE PREFERRED EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
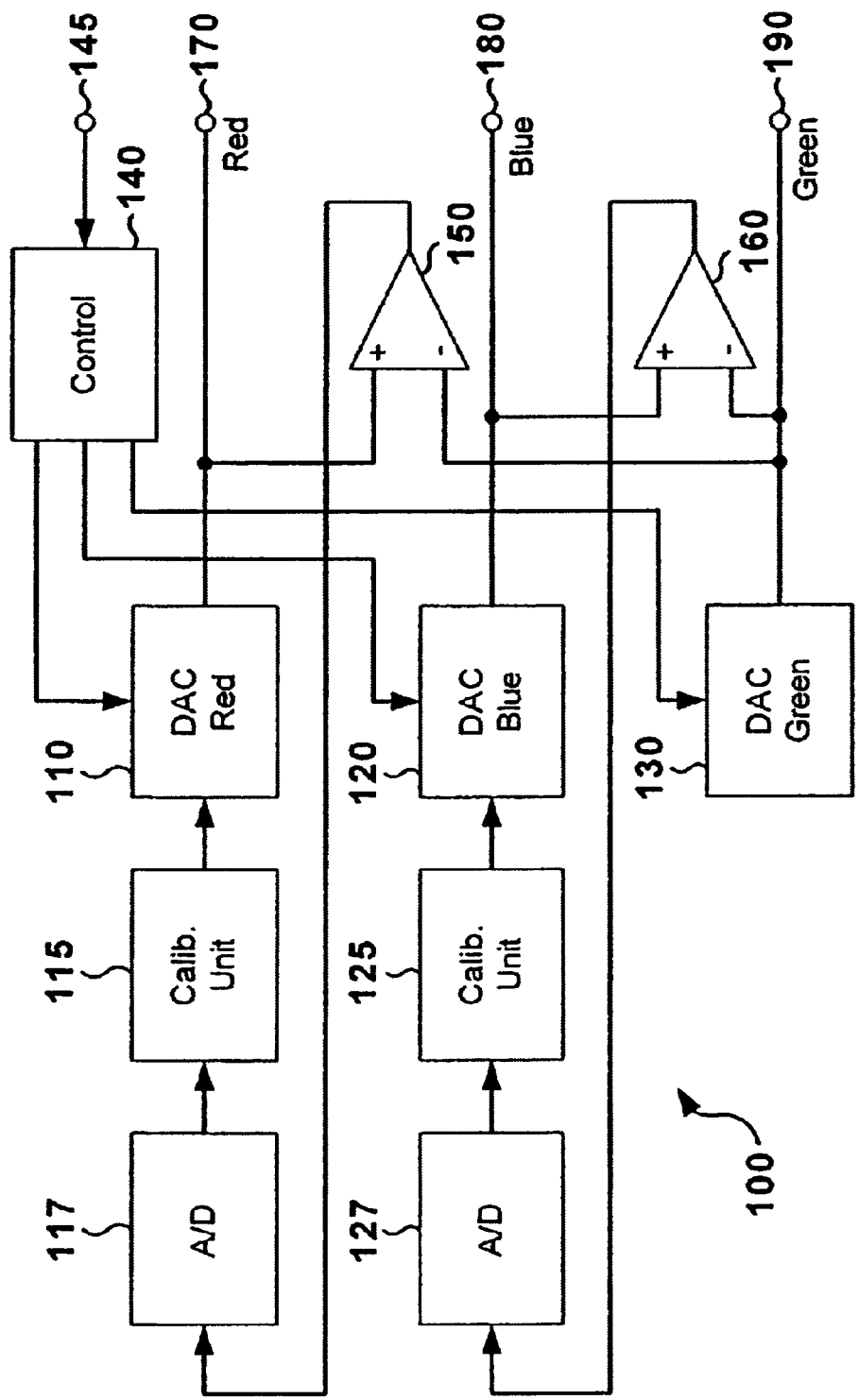
FIG. 1 is a block diagram of an exemplary embodiment according to the present invention.

Turning to the drawings, exemplary embodiments of the present application will now be described. FIG. 1 shows a block diagram of an exemplary embodiment of the present invention. Three digital-to-analog converters 110, 120, and 130 are shown. The digital-to-analog converter 110 is responsible to generate a RED-signal, digital-to-analog converter 120 generates a BLUE-signal, and digital-to-analog converter 130 generates a GREEN-signal for generating an RGB-video signal. A control unit 140 is provided to transfer control signals to the digital-to-analog converters 110, 120, and 130 and receives, for example, a reset input; signal at terminal 145. The output of digital-to-analog converter 110 is coupled with the first input of a comparator 150 and with a terminal 170. The output of comparator 150 is coupled with the input of an analog-to-digital converter 117 whose output signal is fed to the input of a calibration unit 115. The output of calibration unit 115 is coupled with the digital-to-analog converter 110. The output of digital-to-analog converter 120 is coupled with the first input of comparator 160 and a terminal 180. The output of comparator 160 is coupled with the input of another analog-to-digital. converter 127 whose output signal is fed to another calibration unit 125. The output of calibration unit 125 is coupled with digital-to-analog converter 120. Finally, the output of digital-to-analog converter 130 is coupled with the second input of comparator 150, the second input of comparator 160 and a terminal 190.

This arrangement allows for an automatic self-adjustment of the RED, GREEN, and BLUE digital-to-analog converter outputs. The adjustment can be made, for example, at hardware reset time and can persist until the next hardware reset occurs. Of course, other events can trigger a calibration cycle, such as, a manually generated trigger signal or a periodically generated trigger signal. To this end a reset signal can be applied to terminal 145 which will start a calibration cycle. Control unit 140 then transfers a logic "1" to all inputs of the digital-to-analog converters 110, 120, 130 to generate a "WHITE" output signal at terminals 170, 180, and 190. Comparator 150 now compares the output signals of digital-to-analog converters 110 and 130 and generates a difference signal at its output. Analog-to-digital converter 117 converts this difference signal into a digital value which is fed and stored within calibration unit 115. Calibration unit 115 then generates a calibration signal based upon the difference signal from comparator 150. This calibration signal is used to calibrate digital-to-analog converter 110 to now generate the same output level at terminal 170 as digital-to-analog converter 130 at terminal 190. Similarly, comparator 160 generates a difference signal from the output of digital-to-analog converter 120 and 130. This difference signal is converted into a digital value by analog-to-digital converter 127 and fed to a second calibration unit 125. Again, calibration unit 125 stores this value and generates a calibration signal used by digital-to-analog converter 120 to generate the same signal level at terminal 180 as digital-to-analog converter 130 at terminal 190. This ends the calibration cycle and all signals at terminals 170, 180, and 190 now have the same calibrated level.

Figure 2:
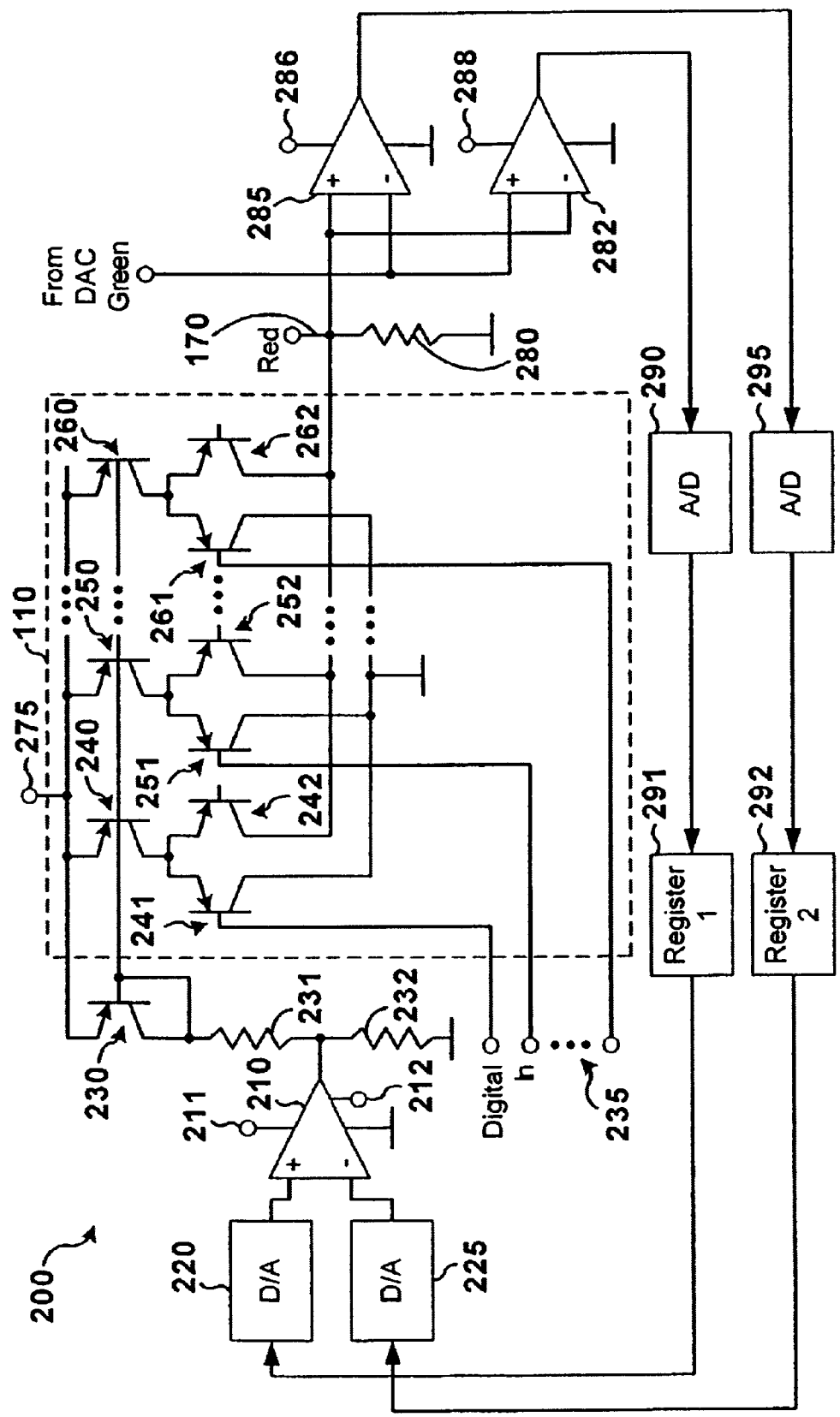
FIG. 2 is a circuit diagram of another embodiment of the present invention for one of the DACs of a digital-to-analog converter arrangement.

FIG. 2 displays a more detailed exemplary embodiment of the present invention showing only the RED digital-to-analog converter. A similar circuit arrangement will be provided for the BLUE digital-to-analog converter. An 8-bit digital-to-analog converter 110 generates an output signal which is fed to the non-inverting input of a comparator 285 and the inverting input of comparator 287. The output of digital-to-analog converter 110 is also coupled with ground through a resistor 280. The inverting input of comparator 285 and the non-inverting input of comparator 287 receive the output signal from the GREEN digital-to-analog converter 130 (not shown in FIG. 2). Comparators 285 and 287 are coupled with a supply voltage through terminals 286 and 288, respectively and with ground. The output of comparator 285 is coupled with the input of an analog-to-digital converter 290. The output of analog-to-digital converter 290 is coupled with the input of a first register 291. The output of register 291 is coupled with a digital-to-analog converter 220 whose output is connected to the non-inverting input of an operational amplifier 210. Similarly, the output of comparator 287 is coupled with the input of an analog-to-digital converter 295. The output of analog-to-digital converter 295 is coupled with the input of a second register 292. The output of register 292 is coupled with a digital-to-analog converter 225 whose output is connected to the inverting input of the operational amplifier 210. Operational amplifier receives a supply voltage through terminal 211 and is coupled with ground. Furthermore, operational amplifier 210 comprises an offset input 212. The output of operational amplifier 210 is coupled with ground through a resistor 232 and with the collector and base of a transistor 230 through a resistor 231. The emitter of transistor 230 is coupled with a supply voltage terminal 275 and the emitters of a plurality of transistors 240, 250, . . . 260 within digital-to-analog converter 110. The base of transistor 230 is coupled with the base of each of the plurality of transistors 240, 250, . . . 260. The collector of transistor 240 is coupled with the emitters of a transistor pair 241, 242. Similarly the collectors of all other transistors of the plurality of transistors 240, 250, . . . 260 are coupled with the emitters of a respective transistor pair 251, 252; . . . 261, 262. The collectors of transistors 241, 251, . . . 261 are interconnected and coupled with ground. The collectors of transistors 242, 252, . . . 262 are interconnected and form the output of digital-to-analog converter 110. The base of transistors 241, 251, . . . 261 are coupled with the respective digital input terminals 235 of digital-to-analog converter 110. The base of transistors 242, 252, . . . 262 are coupled with a reference voltage (not shown in FIG. 2).

Digital-to-analog converter 110 can be configured as a 8-bit, 10-bit, or n-bit digital-to-analog converter depending on the number of the plurality of transistors 240, 250, . . . 260. Usually 8-bit digital-to-analog converters are used on graphics controller ASICs, one each for RED, GREEN, and BLUE outputs. However, if other output standards are used, the present invention can easily be applied to a different configuration of digital-to-analog converters. 10-bit digital-to-analog converters are often used as well for more precise video signals. The transistor pairs 241, 242; 251, 252; . . . 261, 262 are used to form current switches. The unit of current switched by each current switch is developed by current mirrors comprised of transistor 230 together with the plurality of transistors 240, 250, . . . 260, respectively. Thus, when a logic "1" is applied to the digital inputs 235, the respective current delivered to the output node is, for example, 18.7 mA. The voltage developed at the output node is this output current through, for example, a nominally 37.5 Ohm DC termination 280, or approximately 700 mV.

The reference current for the digital-to-analog converter current mirrors is developed through a series combination of the current set resistors 231 and 232. According to the present invention the voltage level at node between resistor 231 and resistor 232 can be adjusted through operational amplifier 210.

The output signal of RED digital-to-analog converter 110 is compared to the GREEN analog output via two unity gain comparators 285 and 287. If the RED signal is greater than the GREEN signal then comparator 285 outputs the difference voltage and comparator 287 outputs "0". If the GREEN signal is greater than the RED signal, then comparator 287 outputs the difference voltage and comparator 285 outputs "0". The analog difference voltage is then converted to a, for example, 4-bit value via 4-bit analog-to-digital converters 290 and 295, respectively. This value is then stored permanently, for example, until the next initiated adjustment cycle, in registers 291 and 292, respectively. Therefore, depending upon whether the RED signal or the GREEN signal was the larger voltage value, either the output of register 291 or register 292 will contain a digital representation of the difference. This value is then converted back into analog values through respective digital-to-analog converters 220, and 225 and fed to the inputs of operational amplifier 210. If the output signal of digital-to-analog converter 220 is positive the output of operational amplifier is pulled up causing the reference current and, therefore, the output of digital-to-analog converter 110 to decrease. Thus, the level of the RED signal is reduced. By the proper choice of resistor values 231 and 232, the RED output voltage can be reduced to a voltage value that is very close to the value of the GREEN voltage output. The resulting difference can, thus, lie within approximately a single LSB. If the output of digital-to-analog converter 225 is positive, the output of operational amplifier 210 will be pulled lower, thus, leading to an increase in the RED digital-to-analog converter output current and hence voltage.

The offset input 212 of operational amplifier is used to keep the voltage value at the output node of operational amplifier 210 unchanged when the voltage value of the RED signal and the GREEN signal are equal. It can be adjusted by design (not shown in FIG. 2) in a way that it has a nominal voltage value at the output node of operational amplifier 210.

A similar comparison is made between the BLUE and the GREEN signal, whereby the correction is applied to the BLUE digital-to-analog converter as described above for the RED versus GREEN digital-to-analog converters.

The conversion to a digit signal and back to an analog signal by means of analog-to-digital converters 290, 295, and digital-to-analog converters 220, 225, respectively is required to facilitate storage of the correction values in digital registers.

Figure 3:
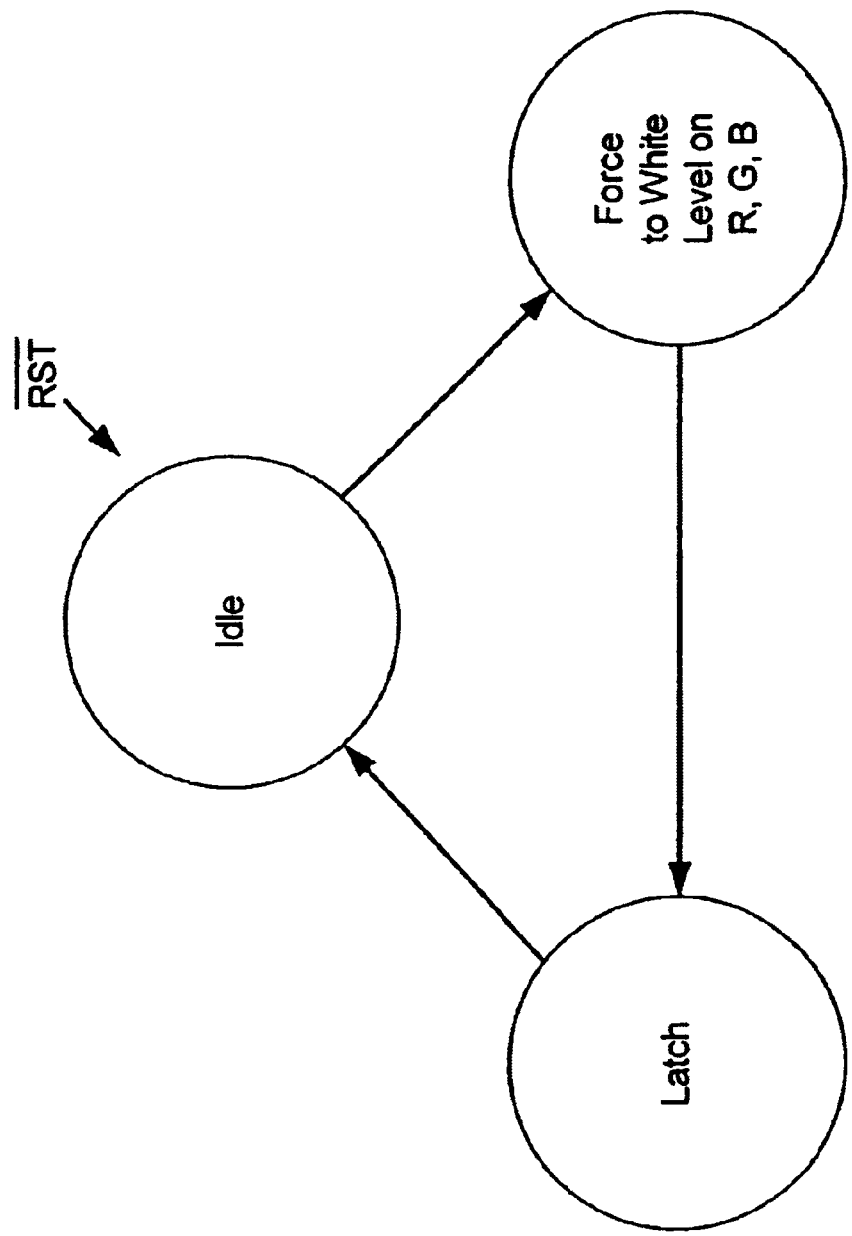
FIG. 3 is state machine diagram according to the invention.

FIG. 3 illustrates the simple state machine required to drive the adjustment circuitry according to the present invention. For example, on the trailing edge of a reset signal RST*, the first state forces all RED, GREEN, and BLUE digital-to-analog converter outputs to the white level by forcing logic "1" input signals on all digital-to-analog converter inputs. The next state latches the difference values into the registers as shown in FIG. 2. After that, the state machine returns to the idle state. A suitable low-frequency clock (internal to the ASIC) would provide the clock source for the state machine and the registers. The only requirement on this clock is that it is slow enough to allow for settling on the cable between the graphics ASIC and the monitor before the correction values are latched.

The invention, therefore, is well adapted to carry out the objects and attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. Information handling system with a self-calibrating video circuit comprising:

a first and second digital-to-analog converter generating first and second output signals; and a calibration circuit coupled with the first and second digital-to-analog converters for calibrating the first digital-to-analog converter output signal to the output signal of the second digital-to-analog converter.

2. Information handling system according to claim 1, the calibration circuit comprises a comparator for comparing the level of the first and second output signal and generating a calibration signal fed to the first digital-to-analog converter.

3. Information handling system according to claim 2, wherein the comparator comprises a first and second comparator for generating a positive or negative difference signal.

4. Information handling system according to claim 1, comprising a third digital-to-analog converter generating a third output signal and a second calibration circuit coupled with the third and second digital-to-analog converters for calibrating the third digital-to-analog converter output signal to the output signal of the second digital-to-analog converter.

5. Information handling system with a self-calibrating video circuit comprising:

a first and second digital-to-analog converter generating first and second output signals;

a calibration circuit coupled with the first and second digital-to-analog converters for calibrating the first digital-to-analog converter output signal to the output signal of the second digital-to-analog converter, the calibration circuit comprises a comparator for comparing the level of the first and second output signal and generating a calibration signal fed to the first digital-to-analog converter; and an analog-to-digital converter receiving the calibration signal and a calibration unit coupled with the output of the analog-to-digital converter and the first digital-to-analog converter.

6. Information handling system according to claim 5, wherein the calibration unit comprises a register for storing the output signal of the analog-to-digital converter.

7. Information handling system according to claim 6, further comprising another digital-to-analog converter coupled with the register and an offset generator coupled with the another digital-to-analog converter for generating an offset signal fed to the first digital-to-analog converter.

8. Information handling system according to claim 7, wherein the offset generator comprises a operational amplifier.

9. Information handling system with a self-calibrating video circuit comprising:

a first and second digital-to-analog converter generating first and second output signals;

a calibration circuit coupled with the first and second digital-to-analog converters for calibrating the first digital-to-analog converter output signal to the output signal of the second digital-to-analog converter, the calibration circuit comprises a comparator for comparing the level of the first and second output signal and generating a calibration signal fed to the first digital-to-analog converter, wherein the comparator comprises a first and second comparator for generating a positive or negative difference signal; and associated first and second analog-to-digital converters coupled with associated first and second registers for storing a positive or negative calibration value.

10. Information handling system according to claim 9, further comprising associated third and fourth digital-to-analog converters each having an input coupled with the first and second registers, respectively and an operational amplifier for generating a calibration signal fed to the first digital-to-analog converter wherein the third and fourth digital-to-analog converters each comprise an output coupled with a first and second input of the operational amplifier, respectively.

11. Information handling system according to claim 10, wherein the operational amplifier has an offset input.

12. Method of operating an information handling system having a self-calibrating video circuit with a first and second digital-to-analog converter generating a first and second output signal, the method comprising the steps of:

applying a digital white signal to the first and second digital-to-analog converter;

determining the difference between a first and a second output signal; and calibrating the first digital-to-analog converter to match the output signal of the second digital-to-analog converter.

13. Method according to claim 12, wherein the step applying a digital white signal includes the transfer of logical "1" input signals to the digital-to-analog converters.

14. Method of operating an information handling system having a self-calibrating video circuit with a first and second digital-to-analog converter generating a first and second output signal, the method comprising the steps of:

applying a digital white signal to the first and second digital-to-analog converter;

determining the difference between a first and a second output signal;

calibrating the first digital-to-analog converter to match the output signal of the second digital-to-analog converter; and storing the difference in a register.

15. Method according to claim 14, wherein storage of the difference is performed after a predetermined settling time.

16. Method of operating an information handling system having a self-calibrating video circuit with a first and second digital-to-analog converter generating a first and second output signal, the method comprising the steps of:

applying a digital white signal to the first and second digital-to-analog converter;

determining the difference between a first and a second output signal; and calibrating the first digital-to-analog converter to match the output signal of the second digital-to-analog converter;

wherein the applying, determining, and calibrating steps are performed after a reset of the information handling system.

17. Method of operating an information handling system having a self-calibrating video circuit with a first and second digital-to-analog converter generating a first and second output signal, the method comprising the steps of:

applying a digital white signal to the first and second digital-to-analog converter;

determining the difference between a first and a second output signal; and calibrating the first digital-to-analog converter to match the output signal of the second digital-to-analog converter;

wherein the applying, determining, and calibrating steps are performed after a manual trigger signal.

18. A self-calibrating video circuit comprising:
- a first and second digital-to-analog converter generating first and second output signals; and
- a calibration circuit coupled with the first and second digital-to-analog converters for calibrating the first digital-to-analog converter output signal to the output signal of the second digital-to-analog converter.

19. Video circuit according to claim 18, the calibration circuit comprises a comparator for comparing the level of the first and second output signal and generating a calibration signal fed to the first digital-to-analog converter.

20. Video circuit according to claim 18, comprising a third digital-to-analog converter generating a third output signal and a second calibration circuit coupled with the third and second digital-to-analog converters for calibrating the third digital-to-analog converter output signal to the output signal of the second digital-to-analog converter.

21. A self-calibrating video circuit comprising:
- a first and second digital-to-analog converter generating first and second output signals;
- a calibration circuit coupled with the first and second digital-to-analog converters for calibrating the first digital-to-analog converter output signal to the output signal of the second digital-to-analog converter, the calibration circuit comprises a comparator for comparing the level of the first and second output signal and generating a calibration signal fed to the first digital-to-analog converter; and
- an analog-to-digital converter receiving the calibration signal and a calibration unit coupled with the output of the analog-to-digital converter and the first digital-to-analog converter.

22. Video circuit according to claim 21, wherein the calibration unit comprises a register for storing the output signal of the analog-to-digital converter.

23. Video circuit according to claim 22, further comprising another digital-to-analog converter coupled with the register and an offset generator coupled with the another digital-to-analog converter for generating an offset signal fed to the first digital-to-analog converter.

24. Video circuit according to claim 23, wherein the offset generator comprises a operational amplifier.

25. Video circuit according to claim 19, wherein the comparator comprises a first and second comparator for generating a positive or negative difference signal.

26. A self-calibrating video circuit comprising:
- a first and second digital-to-analog converter generating first and second output signals; and
- a calibration circuit coupled with the first and second digital-to-analog converters for calibrating the first digital-to-analog converter output signal to the output signal of the second digital-to-analog converter, the calibration circuit comprises a comparator for comparing the level of the first and second output signal and generating a calibration signal fed to the first digital-to-analog converter, wherein the comparator comprises a first and second comparator for generating a positive or negative difference signal; and
- associated first and second analog-to-digital converters coupled with associated first and second registers for storing a positive or negative calibration value.

27. Video circuit according to claim 26, further comprising associated third and fourth digital-to-analog converters each having an input coupled with the first and second registers, respectively and an operational amplifier for generating a calibration signal fed to the first digital-to-analog converter wherein the third and fourth digital-to-analog converters each comprise an output coupled with a first and second input of the operational amplifier, respectively.

28. Video circuit according to claim 27, wherein the operational amplifier has an offset input.

* * * * *